(12) United States Patent
Horesh

(10) Patent No.: US 9,936,195 B2
(45) Date of Patent: Apr. 3, 2018

(54) CALIBRATION FOR EYE TRACKING SYSTEMS

(71) Applicant: Intel Corporation, Santa Clara, CA (US)

(72) Inventor: Nizan Horesh, Caesarea (IL)

(73) Assignee: INTEL CORPORATION, Santa Clara, CA (US)

( * ) Notice: Subject to any disclaimer, the term of this patent is extended or adjusted under 35 U.S.C. 154(b) by 235 days.

(21) Appl. No.: 14/534,333

(22) Filed: Nov. 6, 2014

(65) Prior Publication Data

US 2016/0134863 A1   May 12, 2016

(51) Int. Cl.
  *H04N 17/00* (2006.01)
  *H04N 7/18* (2006.01)
  *G06F 3/01* (2006.01)

(52) U.S. Cl.
  CPC .......... *H04N 17/002* (2013.01); *G06F 3/013* (2013.01); *H04N 7/183* (2013.01)

(58) Field of Classification Search
  None
  See application file for complete search history.

(56) References Cited

U.S. PATENT DOCUMENTS

| 7,651,220 | B1 | 1/2010 | Pattikonda |
| 8,982,160 | B2 * | 3/2015 | Yee .......................... G06F 3/013 345/619 |

| 2007/0283263 | A1 * | 12/2007 | Zawde ................ G06F 3/03547 715/700 |
| 2010/0053555 | A1 * | 3/2010 | Enriquez ................ A61B 3/113 351/210 |
| 2010/0158386 | A1 * | 6/2010 | Smilansky .............. G01F 22/00 382/194 |

(Continued)

FOREIGN PATENT DOCUMENTS

WO   2003017203 A1   2/2003

OTHER PUBLICATIONS

International Search Report and Written Opinion received for PCT Application No. PCT/US2015/054621, dated Feb. 1, 2016, 9 pages.

(Continued)

*Primary Examiner* — Edemio Navas, Jr.
(74) *Attorney, Agent, or Firm* — Grossman, Tucker, Perreault & Pfleger, PLLC

(57) ABSTRACT

Generally, this disclosure provides systems, devices, methods and computer readable media for calibration of an eye tracking system. In some embodiments, the method may include analyzing a video stream received from a scene facing camera to detect moving objects and estimate angular locations of the moving objects. The method may also include receiving images from an eye tracking camera and estimating gaze angles of a user's eye, based on the images. The method may further include computing, for each of the moving objects, a first distance measure between the object angular locations and the gaze angles; accepting or rejecting each of the moving objects for use in calibration based on a comparison of the first distance measure to a threshold; and estimating an eye tracking calibration angle based on a minimization of a second distance measure computed between the angular locations of the accepted moving objects and the gaze angles.

26 Claims, 6 Drawing Sheets

(56) References Cited

U.S. PATENT DOCUMENTS

| | | | |
|---|---|---|---|
| 2011/0199536 A1* | 8/2011 | Wolf | G06K 9/42 348/441 |
| 2011/0256520 A1* | 10/2011 | Siefert | G09B 5/10 434/322 |
| 2012/0081527 A1* | 4/2012 | Richardson | H04N 13/0497 348/56 |
| 2012/0105585 A1* | 5/2012 | Masalkar | H04N 13/0022 348/46 |
| 2013/0141531 A1* | 6/2013 | Tu | H04N 19/597 348/43 |
| 2013/0154913 A1 | 6/2013 | Genc et al. | |
| 2013/0235347 A1* | 9/2013 | Hennessey | G06F 3/013 351/210 |
| 2014/0282646 A1* | 9/2014 | McCoy | G06K 9/00597 725/12 |
| 2014/0320397 A1 | 10/2014 | Hennessey et al. | |
| 2014/0361971 A1* | 12/2014 | Sala | G06F 3/041 345/156 |
| 2014/0361984 A1* | 12/2014 | Kim | G06F 3/013 345/156 |
| 2015/0206347 A1* | 7/2015 | Russell | H04N 5/23229 348/360 |
| 2015/0279102 A1* | 10/2015 | Fleck | G06T 19/006 345/419 |

OTHER PUBLICATIONS

Guestrin, E.D. and Eizenman, M., "General Theory of Remote Gaze Estimation Using the Pupil Center and Corneal Reflections," IEEE Transactions of Biomedical Engineering, pp. 1124-1133, vol. 53, No. 6, Jun. 2006.

International Preliminary Report on Patentability and Written Opinion issued in PCT Application No. PCT/US2015/054621, dated May 18, 2017, 6 pages.

\* cited by examiner

CALIBRATION FOR EYE TRACKING SYSTEMS

FIELD

The present disclosure relates to eye tracking systems, and more particularly, to improved calibration for eye tracking systems.

BACKGROUND

Systems that track a user's gaze (i.e., eye tracking systems) are becoming increasingly popular. The capability to track the movement and gaze point of a user's eye allows for more sophisticated user interface possibilities. These eye tracking systems, however, generally need to be calibrated for each user due to physiological differences in the eye anatomy from one person to another. The calibration process is typically performed by presenting a set of points (one at a time) to the user and requesting that the user fix their gaze at that known point while the visual gaze point is estimated. This process is tedious, requires user cooperation and is generally not robust. Additionally, this process requires an active display element (e.g., capable of being controlled by a tracking calibration system) and a relatively large field of view, which may not exist in some platforms including, for example, some wearable devices and automotive environments.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for improved calibration of an eye tracking system. A scene (or world) facing camera may be configured to provide a video stream encompassing a field of view of the surrounding environment that is visible to the user of the system. This video stream may include objects of opportunity that move through the scene and which are reflexively followed by the user's eye. The moving objects may be detected and analyzed to determine their suitability for use in the calibration process and to estimate their visual axis or line of sight. An eye tracking camera may also be configured to provide images used to track the user eye motion and correlate it to the motion of the objects, for example, as determined from the scene facing camera video data. When a correlation is found (e.g., one that exceeds a statistical significance threshold), estimates of the optical or pupillary axis, associated with the gaze of the eye on the object, may be calculated. Differences between the visual axis estimates and the optical axis estimates may be used as a basis for calibration of the eye tracking system as will be described in greater detail below.

Figure 1:
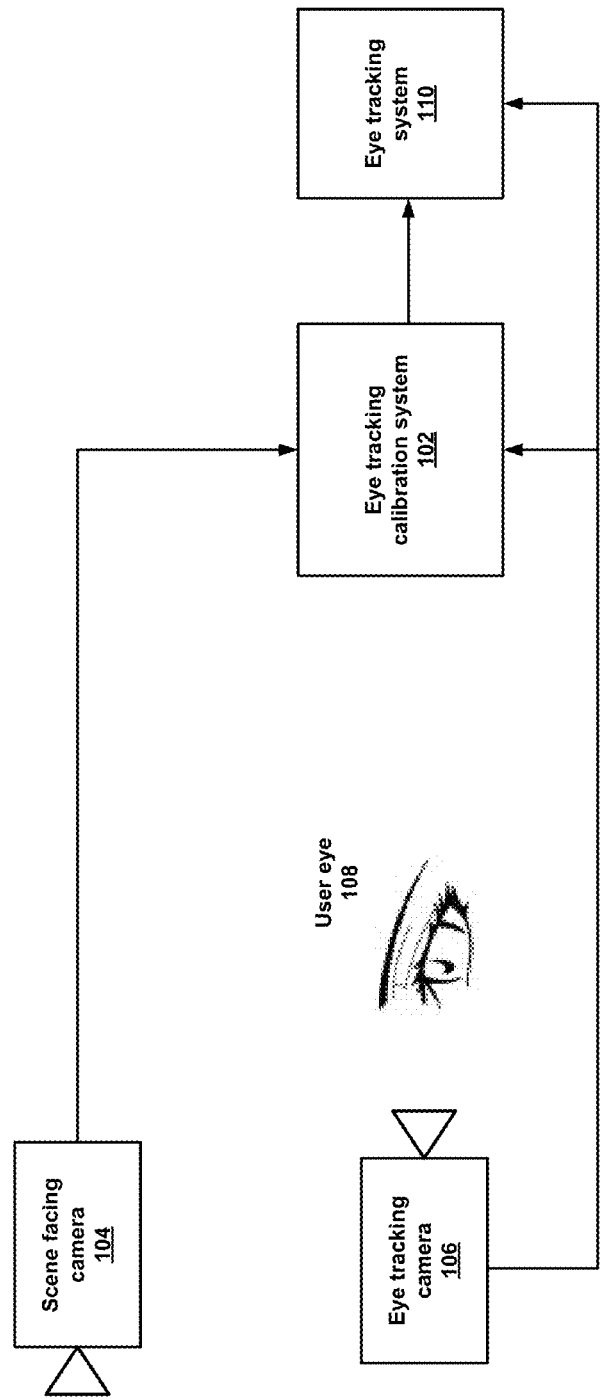
FIG. 1 illustrates a top level system diagram of an example embodiment consistent with the present disclosure.

FIG. 1 illustrates a top level system diagram 100 of one example embodiment consistent with the present disclosure. A scene facing camera 104 may be configured to provide visual data, for example a video stream encompassing a field of view of the surrounding environment that is visible to the user of the system. An eye tracking camera 106 may be also be configured to provide visual data, for example images of the user's eye 108 used to track eye motion and in particular the optical axis of the eye, as will be explained below. Data from the scene facing camera 104 and the eye tracking camera 106 may be provided to the eye tracking calibration system 102 which may be configured to generate calibration parameters and provide these parameters to the eye tracking system 110. The eye tracking system 110 may then track the motion or gaze point of the user's eye based on subsequent data provided by the eye tracking camera 106 with corrections or adjustments based on the calibration parameters.

Figure 2:
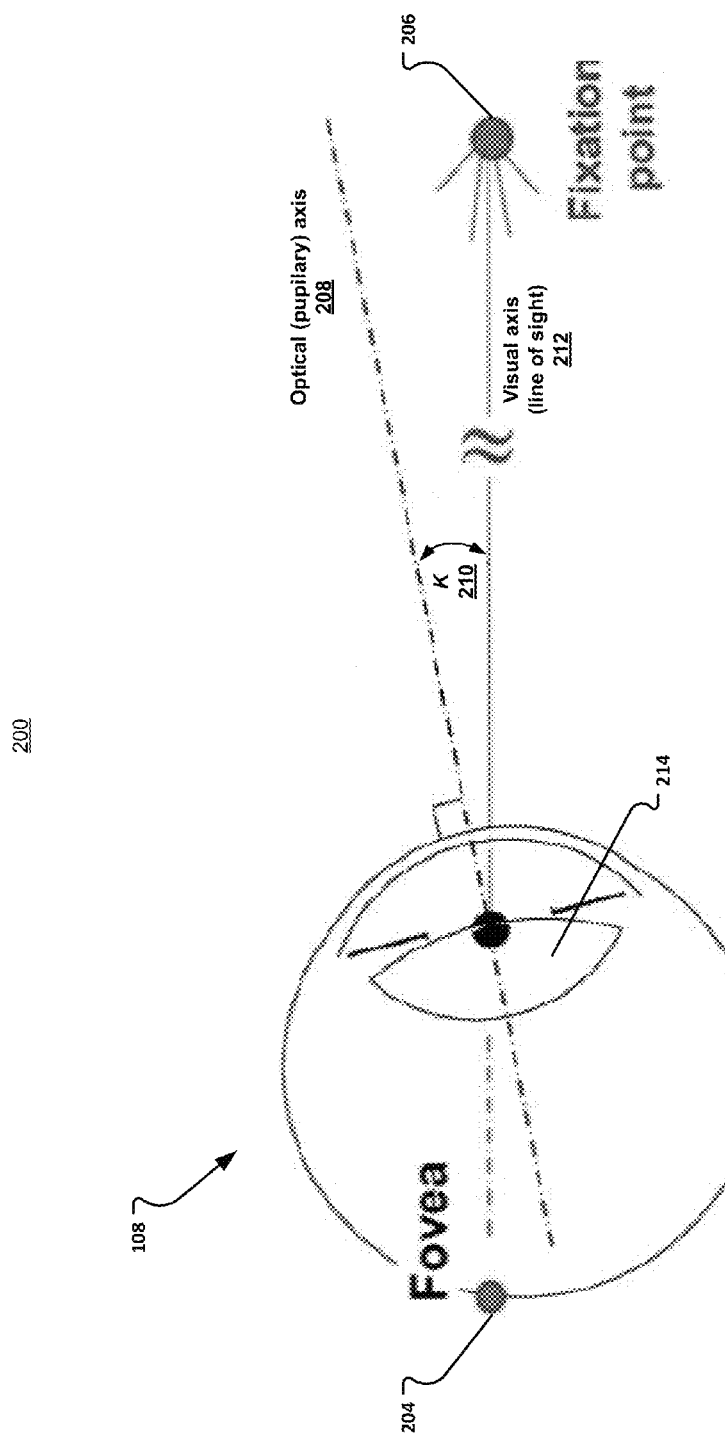
FIG. 2 illustrates a calibration angle with respect to a cross-sectional view of an eye consistent with an example embodiment the present disclosure.

FIG. 2 illustrates a calibration angle with respect to a cross-sectional view 200 of an eye consistent with an example embodiment the present disclosure. The eye 108 includes a lens 214 that focuses an image, for example of an object at the fixation point 206, onto receptors at the back of the eye. The fovea 204 is the area with the greatest density of visual receptors, and thus capable of perceiving an image at the highest resolution. A visual axis (or line of sight) 212 may be drawn between the fovea and the fixation point and represents the actual path along which the user is gazing. In contrast, an optical (or pupillary) axis 208 may be drawn through the center of the pupil and orthogonal to the surface of the lens 214. The optical axis 208 appears to indicate the path along which the user is gazing, but is actually offset by an angle, Kappa (K) 210 from the true visual axis 212.

Eye tracking devices generally rely on a visual inspection of the eye 108 to estimate the optical axis 208. The optical axis 208 may be estimated by measuring the direction that the pupil (at the center of lens 214) is facing. In other words, the optical axis is orthogonal to the surface of the lens 214 at the center of the pupil. The Kappa angle 210, however, differs from person to person and must be estimated through a calibration process for each user since it is needed to calculate the visual axis. The Kappa angle 210 may be expressed as a composition of two relatively orthogonal components, phi ($\phi$) and theta ($\theta$) which may correspond to angular offsets in the vertical and horizontal dimensions respectively.

In addition to the Kappa angle 210, two other anatomical parameters may be used for eye tracking calibration: the cornea radius of curvature (R) and the distance between the pupil plane and the cornea center of curvature (d).

Figure 3:
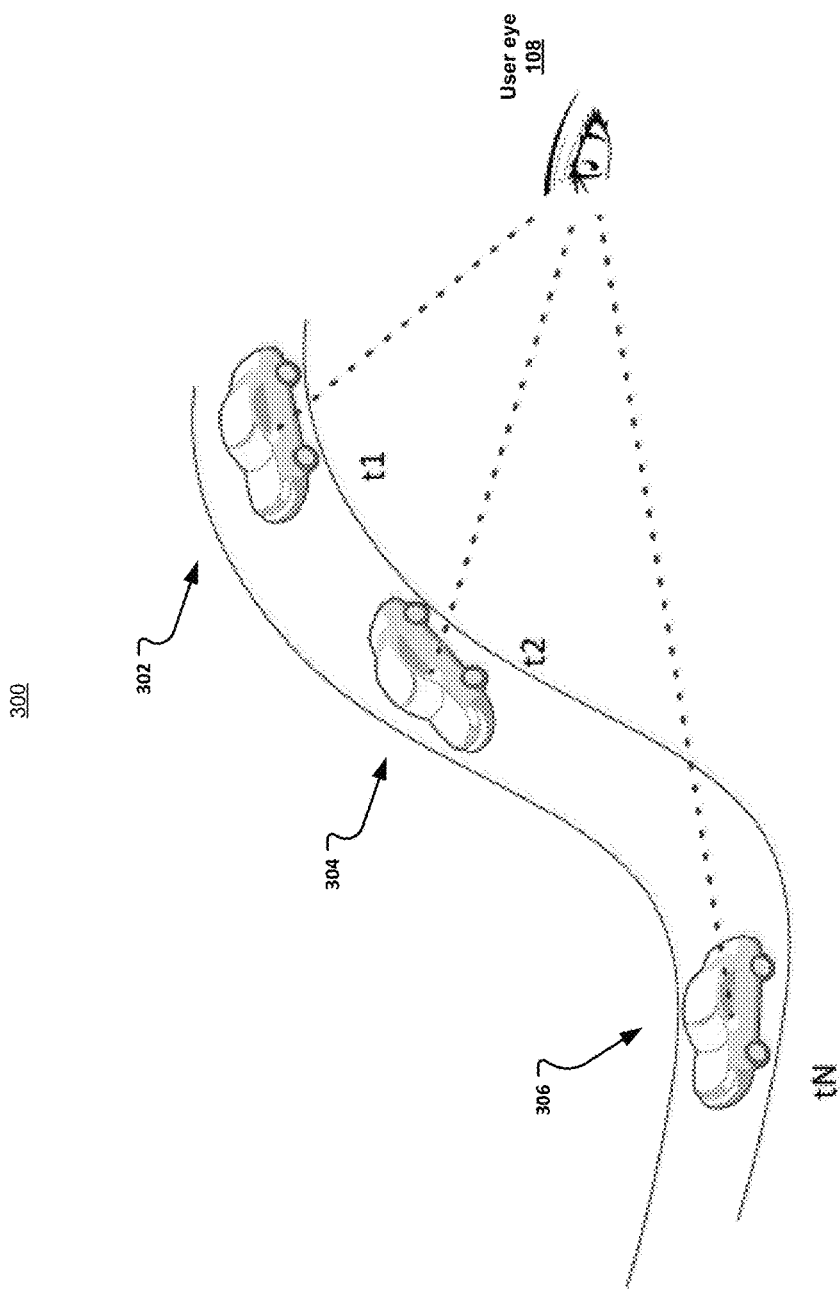
FIG. 3 illustrates an object tracking consistent with an example embodiment the present disclosure.

FIG. 3 illustrates an object tracking 300 consistent with an example embodiment the present disclosure. The human eye generally operates in one of three major modes: (1) Fixation—where the eye is maintaining a visual gaze on a single location; (2) Saccade—a fast movement of the eye or head which usually occurs between two fixations; and (3) Smooth pursuit—where the eye is closely following a moving object. FIG. 2 illustrates smooth pursuit of an object (a car) moving along a path at a number of locations and corresponding points in time: t1, t2, . . . $t_N$ 302, 304, 306. The human visual system follows moving objects instinctively or reflexively In some embodiments, the visual field provided by the scene facing camera is searched for distinctively moving objects and the associated smooth pursuit motion of the eye is captured by the eye tracking camera. When a match between the object motion and the smooth pursuit motion is found with a sufficient degree of confidence, the matching data may be registered or stored in a system database. Calibration parameters may then be calculated based on this data as described below.

Figure 4:
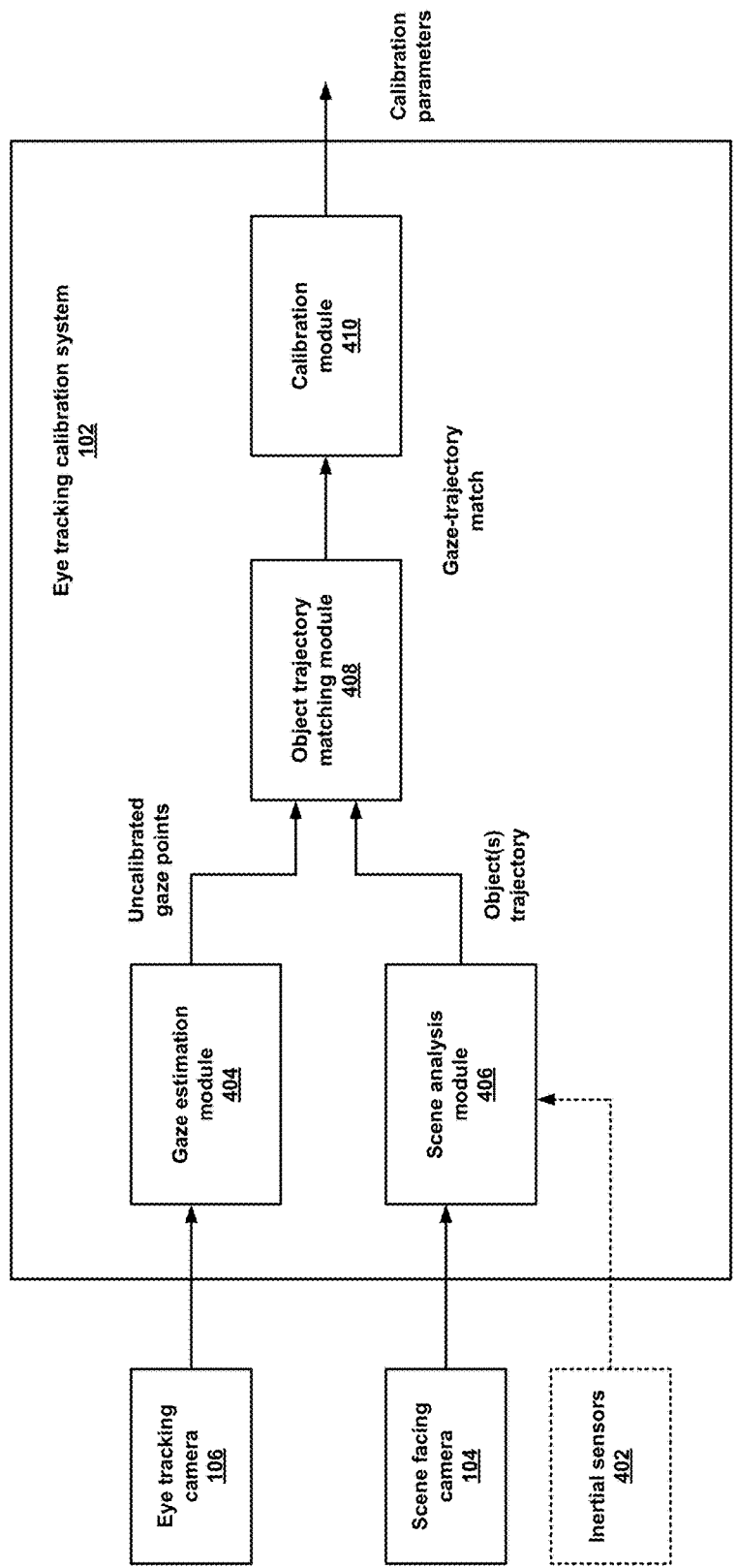
FIG. 4 illustrates a block diagram of one example embodiment consistent with the present disclosure.

FIG. 4 illustrates a block diagram 400 of one example embodiment consistent with the present disclosure. The eye tracking calibration system is shown to include a gaze estimation module 404, a scene analysis module 406, an object trajectory matching module 408 and a calibration module 410.

The gaze estimation module 404 may be configured to receive images from the eye tracking camera 106 and to estimate the gaze angles of the user's eye 108, based on those images, at a number of points over a period of time. The gaze angles correspond to the optical axis 208 and may be estimated using any suitable techniques know in the field of eye tracking. Each gaze angle point may be associated with a time tag.

The scene analysis module 406 may be configured to analyze the video stream received from the scene facing camera to detect moving objects and estimate the angular locations of those objects at a number of points over a period of time. Each object point may be associated with a time tag. Object detection and recognition may be performed using one or more of the following methods: template matching, optical flow tracking, background segmentation, Scale Invariant Feature Transform (SIFT) matching, particle filtering, and/or Positive-Negative tracking.

The object motion detector may be configured to reject objects as not suitable for eye tracking calibration according to one or more of the following criteria:

(a) object visual size—large objects may increase uncertainty regarding the user gaze point.

(b) object visual speed—smooth pursuit speed is typically limited to a maximum of about 30 degrees per second.

(c) object motion—relatively small object motions may be indistinguishable from fixations and saccades.

(d) object self-occlusion—objects that occlude themselves (e.g., rotate around their own axis) may create a gaze pattern that is inconsistent with the overall motion of the body of the object.

(e) object contrast—objects with relatively low contrast may increase uncertainty regarding the user gaze point.

(f) object distinctiveness—when many objects move in a similar pattern, the motion may increase uncertainty regarding which object the user's gaze is tracking.

Additionally, in some embodiments, an inertial sensor may be employed to measure the motion of the scene facing camera in world coordinates. Objects that are determined to be moving with the camera (i.e., not moving in the real world) may be rejected.

The object trajectory matching module 408 may be configured to match the object motion data to the gaze data. The object motion points are converted to rays in the coordinate system of the user's eye. This may be based on an assumption that the distance between the object and the scene facing camera is relatively large compared to the distance between the camera and the eye, which, in a wearable device, may be only a few centimeters. Alternatively, in some embodiments, a depth or distance sensing device may be employed to estimate the distance between the object and the scene facing camera. For example, a stereo camera may be used for this purpose.

At this point, the object trajectory matching module 408 has object coordinates $[\theta_i, \phi_i, t_i]_{Obj}$ and eye gaze coordinates $[\theta_j+\theta_0, \phi_j+\phi_0, t_j+t_0]_{Eye}$, where $\theta_0$ and $\phi_0$ are the calibration angles (Kappa) and $t_0$ represents the clock sampling time difference between the two cameras. Resampling may be performed to bring the object coordinates and the eye gaze coordinates to a common time coordinate system $t_i$ and to eliminate the $t_0$ offset term. A distance measurement may then be calculated between the matched object coordinates and eye gaze coordinates which minimizes the calibration angles $\theta_0$ and $\phi_0$:

$$\text{Min}_{\theta_0,\phi_0}\|[\theta_i,\phi_i]_{Obj}-[\theta_i+\theta_0,\phi_i+\phi_0]_{Eye}\|$$

In some embodiments, the distance measure may be a Euclidean norm, i.e., $\|\theta_i,\phi_i\|=\Sigma_i\sqrt{\theta_i^2+\phi_i^2}$. In other words, the sum of the distances between the object angular positions and the gaze direction is minimized subject to the calibration angles $\theta_0, \phi_0$. In general, this is a non-linear minimization problem with 2 degrees of freedom ($\theta_0, \phi_0$). The minimization may be performed by a general numerical optimization technique, such as, for example, the Newton-Gauss algorithm or the Levenberg-Marquardt algorithm.

In some embodiments, additional calibration parameters may be estimated to include the cornea radius of curvature (R) and the distance between the pupil plane and the cornea center of curvature (d). In these embodiments, distance measurement minimization calculation includes R and d as follows:

$$\text{Min}_{\theta_0,\phi_0,R,d}\|[\theta_i,\phi_i]_{Obj}-[\theta_i(R,d)+\theta_0,\phi_i(R,d)+\phi_0]_{Eye}\|,$$

where the functional relationship between the gaze angles and the and the calibration parameters R, d may be derived from the geometry of the eye tracking device by known methods. The numerical optimization may be subjected to pre-defined constraints on each of the parameters. For example, the parameters may be limited to be within a range of normal anatomical values.

If the measured distance exceeds a threshold, the matched data may be rejected. Otherwise, the matched data may be passed to the calibration module 410. The threshold may be computed by a statistical model that accounts for the noise associated with the object tracking and gaze tracking to enable the match to meet a pre-defined statistical significance level. It will be appreciated that embodiments of the present disclosure rely on spontaneous object tracking that may or may not occur, unlike other gaze calibration systems that assume the user is watching a known object which is usually a static point. Thus, the acceptance/rejection criteria are useful to determine if the user was actually gazing at the object that was detected by the scene analysis module 406.

The calibration module 410 may be configured to collect the matched object motion data and gaze data, as provided by module 408, for one or more moving objects that were detected and accepted. The detection and matching of multiple moving objects may be expected to improve the calibration process as described herein.

The calibration module 410 may be configured to analyze the total spatial coverage of the motions of the objects and decide if that coverage is sufficient to achieve an acceptable calibration quality. In some embodiments, the decision criteria may be based on the gaze point extremities reaching or exceeding pre-defined threshold values. For example, $$\theta_{min} < -30°, \theta_{max} > +30°, \phi_{min} < -20°, \phi_{max} > +20°$$

The collection of object motion data and gaze data may then be optimized over all of the accepted objects such that the distance measure between the object motion data and the gaze data will be minimized subject to the calibration angles $\theta_0$ and $\phi_0$:

$$\text{Min}_{\theta_0, \phi_0} \sum_{Objects} \|[\theta_i, \phi_i]_{Obj} - [\theta_i + \theta_0, \phi_i + \phi_0]_{Eye}\|$$

to generate the resultant calibration parameters. Similarly, in embodiments where the additional calibration parameters R, d are to be estimated, this numerical optimization may be expressed as:

$$\text{Min}_{\theta_0, \phi_0, R, d} \sum_{Objects} \|[\theta_i, \phi_i]_{Obj} - [\theta_i(R, d) + \theta_0, \phi_i(R, d) + \phi_0]_{Eye}\|$$

Figure 5:
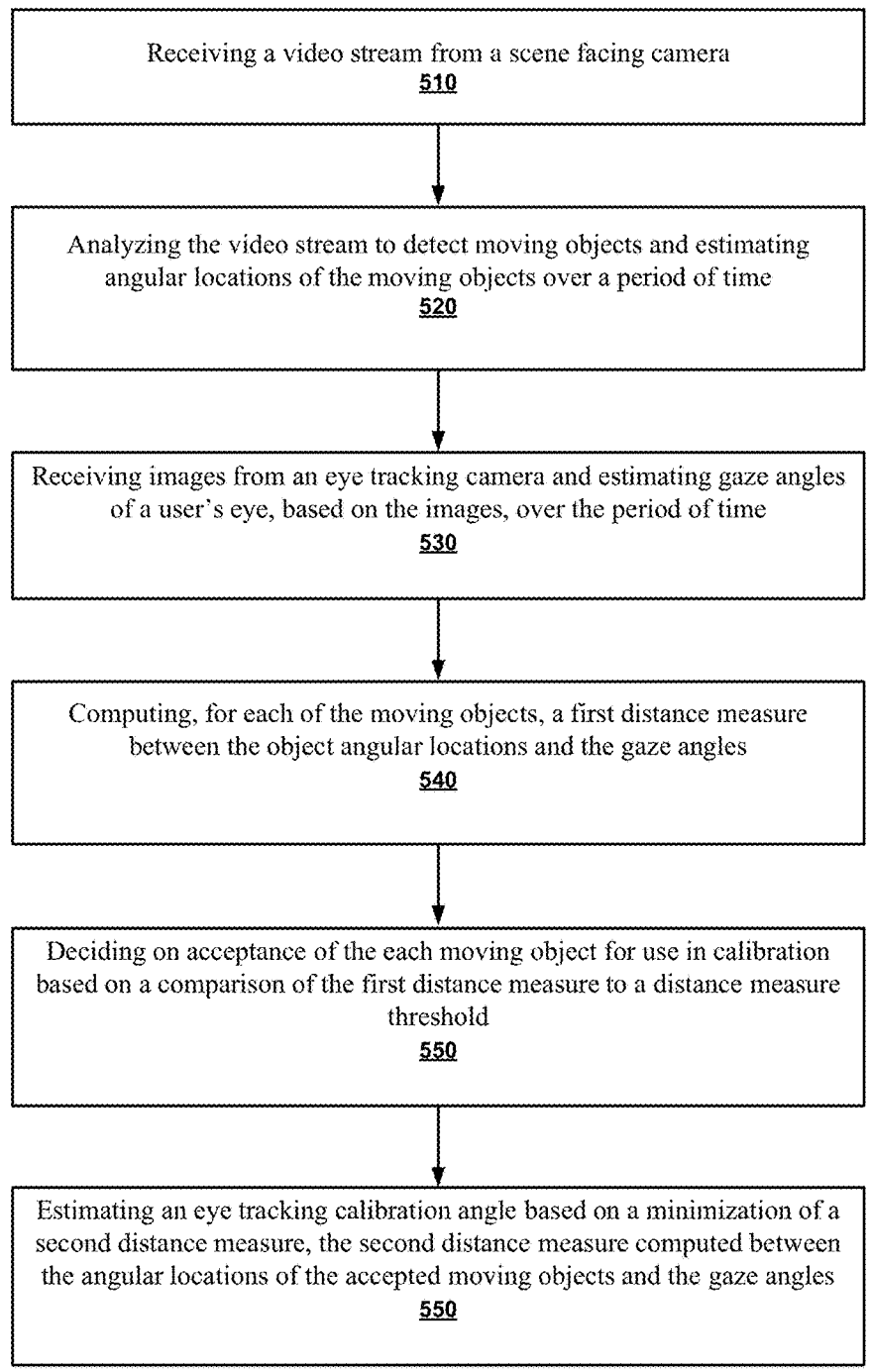
FIG. 5 illustrates a flowchart of operations of one example embodiment consistent with the present disclosure.

FIG. 5 illustrates a flowchart of operations 500 of one example embodiment consistent with the present disclosure. The operations provide a method for improved calibration of an eye tracking system. At operation 510, a video stream is received from a scene facing camera. At operation 520, the video stream is analyzed to detect moving objects and estimate angular locations of the moving objects over a period of time. At operation 530, images are received from an eye tracking camera and gaze angles of a user's eye are estimated, based on the images, over a period of time. At operation 540, for each of the moving objects, a first distance measure is computed between the object angular locations and the gaze angles. At operation 550, a decision is made to accept or reject each of the moving objects, for use in calibration, based on a comparison of the first distance measure to a distance measure threshold.

At operation 560, an eye tracking calibration angle is estimated based on a minimization of a second distance measure. The second distance measure is computed between the angular locations of the accepted moving objects and the gaze angles.

Figure 6:
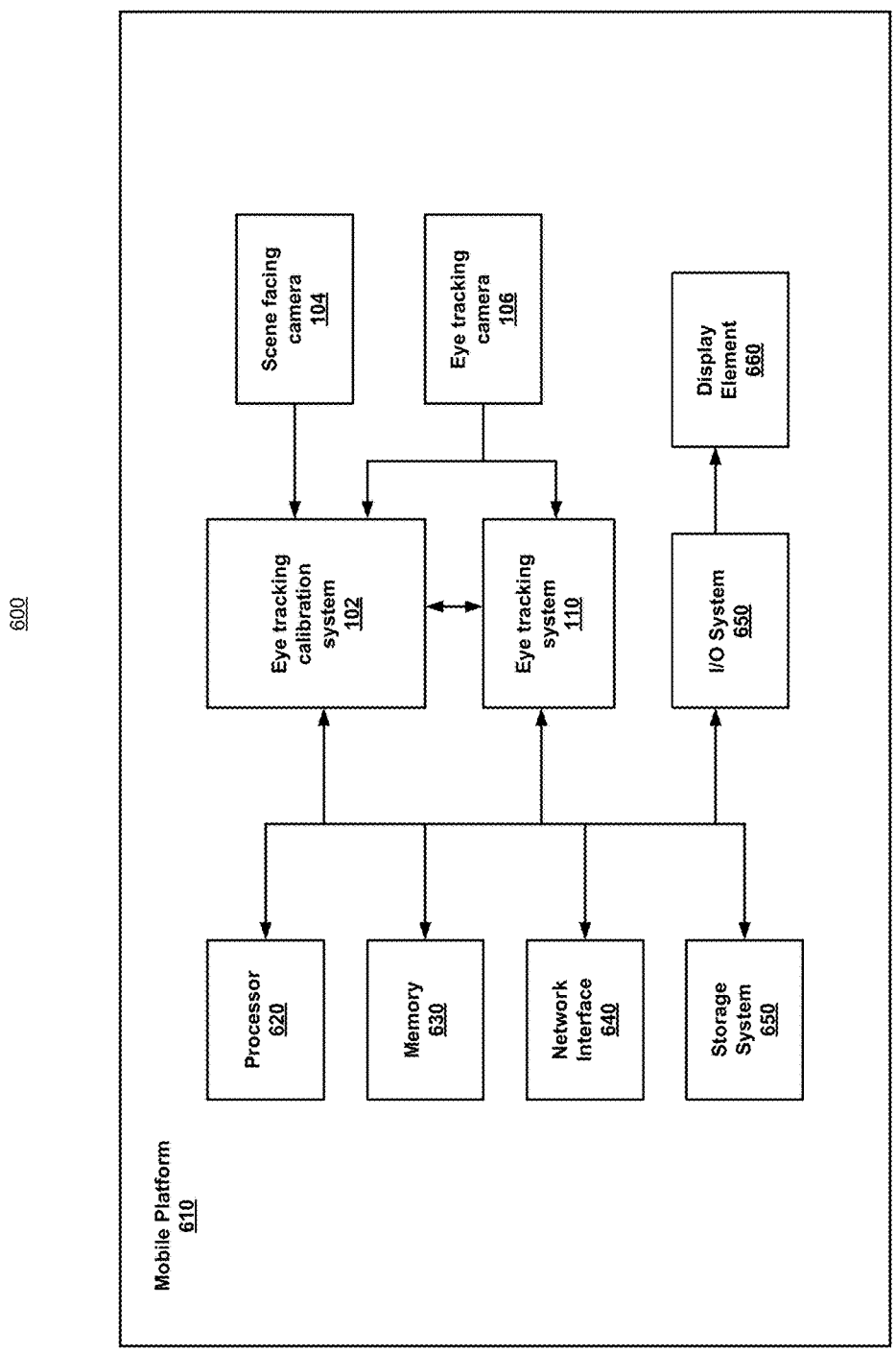
FIG. 6 illustrates a system diagram of a platform of another example embodiment consistent with the present disclosure.

FIG. 6 illustrates a system diagram 600 of one example embodiment consistent with the present disclosure. The system 600 may be a mobile platform 610 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 600 may be a workstation or desktop computer. The device may generally present various interfaces to a user via a display element 660 such as, for example, a touch screen, liquid crystal display (LCD) or any other suitable display type.

The system 600 is shown to include any number of processors 620 and memory 630. In some embodiments, the processors 620 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 630 may be coupled to the processors. The memory 630 may be any of a wide variety of memories (including various layers of memory hierarchy and/or memory caches) as are known or otherwise available to those of skill in the art. It will be appreciated that the processors and memory may be configured to store, host and/or execute one or more user applications or other software modules. These applications may include, but not be limited to, for example, any type of computation, communication, data management, data storage and/or user interface task. In some embodiments, these applications may employ or interact with any other components of the mobile platform 610.

System 600 is also shown to include network interface module 640 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

System 600 is also shown to include a storage system 650, for example a hard disk drive (HDD) or solid state drive (SSD).

System 600 is also shown to include an input/output (IO) system or controller 650 which may be configured to enable or manage data communication between processor 620 and other elements of system 600 or other elements (not shown) external to system 600.

System 600 is further shown to include eye tracking system 110, eye tracking calibration system 102, scene facing camera 104 and eye tracking camera 106 configured to provide eye tracking capability with improved eye tracking calibration as described previously.

It will be appreciated that in some embodiments, the various components of the system 600 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for improved calibration of an eye tracking system. The following examples pertain to further embodiments.

According to Example 1 there is provided an eye tracking calibration system. The system may include a scene analysis module configured to receive a video stream from a scene facing camera and to analyze the video stream to detect moving objects and to estimate angular locations of the moving objects over a period of time. The system of this example may also include a gaze estimation module configured to receive images from an eye tracking camera and to estimate gaze angles of a user's eye, based on the images, over the period of time. The system of this example may further include an object trajectory matching module configured to compute, for each of the moving objects, a first distance measure between the object angular locations and the gaze angles, and further to decide on acceptance of the each moving object for use in calibration based on a comparison of the first distance measure to a distance measure threshold. The system of this example may further include a calibration module configured to estimate an eye tracking calibration angle based on a minimization of a second distance measure, the second distance measure computed between the angular locations of the accepted moving objects and the gaze angles.

Example 2 may include the subject matter of Example 1, and the scene analysis module is further configured to detect the moving objects based on template matching, optical flow tracking, background segmentation, Scale Invariant Feature Transform (SIFT) matching, particle filtering and/or Positive-Negative tracking.

Example 3 may include the subject matter of any of Examples 1 and 2, and the scene analysis module is further configured to reject the moving objects based on a visual size of the moving object exceeding a size threshold.

Example 4 may include the subject matter of any of Examples 1-3, and the scene analysis module is further configured to reject the moving objects based on a visual speed of the moving object exceeding a speed threshold.

Example 5 may include the subject matter of any of Examples 1-4, and the scene analysis module is further configured to reject the moving objects based on a determination that the extremities of the gaze angle associated with the moving object fail to exceed a range of motion threshold.

Example 6 may include the subject matter of any of Examples 1-5, further including an inertial sensor configured to track motion of the scene facing camera such that the scene analysis module may further reject the moving objects based on a correlation of the object motion with the scene facing camera motion.

Example 7 may include the subject matter of any of Examples 1-6, and the minimization is based on a Newton-Gauss algorithm or a Levenberg-Marquardt algorithm.

Example 8 may include the subject matter of any of Examples 1-7, further including a depth measurement device configured to estimate the distance between the moving object and the scene facing camera for conversion of locations of the moving objects from a world coordinate system to an eye coordinate system.

Example 9 may include the subject matter of any of Examples 1-8, and the object trajectory matching module is further configured to resample the estimated object angular locations and the estimated gaze angles to a common time coordinate system.

According to Example 10 there is provided a method for eye tracking calibration. The method may include receiving a video stream from a scene facing camera; analyzing the video stream to detect moving objects and estimating angular locations of the moving objects over a period of time; receiving images from an eye tracking camera and estimating gaze angles of a user's eye, based on the images, over the period of time; computing, for each of the moving objects, a first distance measure between the object angular locations and the gaze angles; deciding on acceptance of the each moving object for use in calibration based on a comparison of the first distance measure to a distance measure threshold; and estimating an eye tracking calibration angle based on a minimization of a second distance measure, the second distance measure computed between the angular locations of the accepted moving objects and the gaze angles.

Example 11 may include the subject matter of Example 10, and further includes detecting the moving objects based on template matching, optical flow tracking, background segmentation, Scale Invariant Feature Transform (SIFT) matching, particle filtering and/or Positive-Negative tracking.

Example 12 may include the subject matter of any of Examples 10 and 11, and further includes rejecting the moving objects based on a visual size of the moving object exceeding a size threshold.

Example 13 may include the subject matter of any of Examples 10-12, and further includes rejecting the moving objects based on a visual speed of the moving object exceeding a speed threshold.

Example 14 may include the subject matter of any of Examples 10-13, and further includes rejecting the moving objects based on a determination that the extremities of the gaze angle associated with the moving object fail to exceed a range of motion threshold.

Example 15 may include the subject matter of any of Examples 10-14, and further includes tracking motion of the scene facing camera and rejecting the moving objects based on a correlation of the object motion with the scene facing camera motion.

Example 16 may include the subject matter of any of Examples 10-15, and the minimization is based on a Newton-Gauss algorithm or a Levenberg-Marquardt algorithm.

Example 17 may include the subject matter of any of Examples 10-16, and further includes estimating the distance between the moving object and the scene facing camera for conversion of locations of the moving objects from a world coordinate system to an eye coordinate system.

Example 18 may include the subject matter of any of Examples 10-17, and further includes resampling the estimated object angular locations and the estimated gaze angles to a common time coordinate system.

According to Example 19 there is provided at least one computer-readable storage medium having instructions stored thereon which when executed by a processor result in the operations for carrying out a method according to any one of Examples 10-18.

According to Example 20 there is provided a system for eye tracking calibration. The system may include: means for receiving a video stream from a scene facing camera; means for analyzing the video stream to detect moving objects and estimating angular locations of the moving objects over a period of time; means for receiving images from an eye tracking camera and estimating gaze angles of a user's eye, based on the images, over the period of time; means for computing, for each of the moving objects, a first distance measure between the object angular locations and the gaze angles; means for deciding on acceptance of the each moving object for use in calibration based on a comparison of the first distance measure to a distance measure threshold; and means for estimating an eye tracking calibration angle based on a minimization of a second distance measure, the second distance measure computed between the angular locations of the accepted moving objects and the gaze angles.

Example 21 may include the subject matter of Example 20, and further includes means for detecting the moving objects based on template matching, optical flow tracking, background segmentation, Scale Invariant Feature Transform (SIFT) matching, particle filtering and/or Positive-Negative tracking.

Example 22 may include the subject matter of any of Examples 20 and 21, and further includes means for rejecting the moving objects based on a visual size of the moving object exceeding a size threshold.

Example 23 may include the subject matter of any of Examples 20-22, and further includes means for rejecting the moving objects based on a visual speed of the moving object exceeding a speed threshold.

Example 24 may include the subject matter of any of Examples 20-23, and further includes means for rejecting the moving objects based on a determination that the extremities of the gaze angle associated with the moving object fail to exceed a range of motion threshold.

Example 25 may include the subject matter of any of Examples 20-24, and further includes means for tracking motion of the scene facing camera and rejecting the moving objects based on a correlation of the object motion with the scene facing camera motion.

Example 26 may include the subject matter of any of Examples 20-25, and the minimization is based on a Newton-Gauss algorithm or a Levenberg-Marquardt algorithm.

Example 27 may include the subject matter of any of Examples 20-26, and further includes means for estimating the distance between the moving object and the scene facing camera for conversion of locations of the moving objects from a world coordinate system to an eye coordinate system.

Example 28 may include the subject matter of any of Examples 20-27, and further includes means for resampling the estimated object angular locations and the estimated gaze angles to a common time coordinate system.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An eye tracking calibration system comprising:
   an eye tracking camera to track eye movement of a user in communication with a gaze estimation circuitry;
   a scene facing camera in communication with a scene analysis circuitry;
   an inertial sensor in communication with said scene analysis circuitry;
   said scene analysis circuitry detecting moving objects and estimating angular locations of said moving objects over a period of time, wherein said moving objects include two or more objects in a field of view surrounding a user;
   said gaze estimation circuitry receiving images from said eye tracking camera and estimating gaze angles of a user's eye, based on said images, over said period of time;
   an object trajectory matching circuitry computing, for each of said moving objects, a first distance measure between said object angular locations and said gaze angles, and further to decide on acceptance of said each moving object for use in calibration based on a comparison of said first distance measure to a distance measure threshold; and
   a calibration circuitry estimating an eye tracking calibration angle based on a minimization of a second distance measure, said second distance measure computed between said angular locations of said accepted moving objects and said gaze angles.

2. The system of claim 1, wherein said scene analysis circuitry detects said moving objects based on template matching, optical flow tracking, background segmentation, Scale Invariant Feature Transform (SIFT) matching, particle filtering and/or Positive-Negative tracking.

3. The system of claim 1, wherein said scene analysis circuitry rejects said moving objects based on a visual size of said moving object exceeding a size threshold.

4. The system of claim 1, wherein said scene analysis circuitry rejects said moving objects based on a visual speed of said moving object exceeding a speed threshold.

5. The system of claim 1, wherein said scene analysis circuitry rejects said moving objects based on a determination that the extremities of said gaze angle associated with said moving object fail to exceed a range of motion threshold.

6. The system of claim 1, wherein said minimization is based on a Newton-Gauss algorithm or a Levenberg-Marquardt algorithm.

7. The system of claim 1, further comprising a depth measurement device estimating the distance between said moving object and said scene facing camera for conversion of locations of said moving objects from a world coordinate system to an eye coordinate system.

8. The system of claim 1, wherein said object trajectory matching circuitry further resamples said estimated object angular locations and said estimated gaze angles to a common time coordinate system.

9. A method for eye tracking calibration comprising:
   providing an eye tracking calibration system in communication with an eye tracking camera to track eye movement of a user, and a scene facing camera, and an inertial sensor in communication, wherein:
said eye tracking camera is in communication with a gaze estimation circuitry;
said scene facing camera is in communication with a scene analysis circuitry;
said inertial sensor is in communication with said scene analysis circuitry;
said method further comprising:
receiving a video stream from said scene facing camera;
analyzing said video stream to detect moving objects and estimating angular locations of said moving objects over a period of time, wherein said moving objects include two or more objects in a field of view surrounding a user;
receiving images from said eye tracking camera and estimating gaze angles of a user's eye, based on said images, over said period of time;
computing, for each of said moving objects, a first distance measure between said object angular locations and said gaze angles;
deciding on acceptance of said each moving object for use in calibration based on a comparison of said first distance measure to a distance measure threshold; and
estimating an eye tracking calibration angle based on a minimization of a second distance measure, said second distance measure computed between said angular locations of said accepted moving objects and said gaze angles.

10. The method of claim 9, further comprising detecting said moving objects based on template matching, optical flow tracking, background segmentation, Scale Invariant Feature Transform (SIFT) matching, particle filtering and/or Positive-Negative tracking.

11. The method of claim 9, further comprising rejecting said moving objects based on a visual size of said moving object exceeding a size threshold.

12. The method of claim 9, further comprising rejecting said moving objects based on a visual speed of said moving object exceeding a speed threshold.

13. The method of claim 9, further comprising rejecting said moving objects based on a determination that the extremities of said gaze angle associated with said moving object fail to exceed a range of motion threshold.

14. The method of claim 9, further comprising tracking motion of said scene facing camera and rejecting said moving objects based on a correlation of said object motion with said scene facing camera motion.

15. The method of claim 9, wherein said minimization is based on a Newton-Gauss algorithm or a Levenberg-Marquardt algorithm.

16. The method of claim 9, further comprising estimating the distance between said moving object and said scene facing camera for conversion of locations of said moving objects from a world coordinate system to an eye coordinate system.

17. The method of claim 9, further comprising resampling said estimated object angular locations and said estimated gaze angles to a common time coordinate system.

18. At least one non-transitory computer-readable storage medium disposed within a an eye tracking calibration system and having instructions stored thereon, said eye tracking calibration system further comprising an eye tracking camera in communication with a gaze estimation circuitry, a scene facing camera in communication with a scene analysis circuitry, and an inertial sensor in communication with said scene analysis circuitry, wherein when said instructions are executed by a processor result in the following operations for eye tracking calibration, said operations comprising:
receiving a video stream from said scene facing camera;
detecting moving objects and estimating angular locations of said moving objects over a period of time, wherein said moving objects include two or more objects in a field of view surrounding a user;
receiving images from an eye tracking camera and estimating gaze angles of a user's eye, based on said images, over said period of time;
computing, for each of said moving objects, a first distance measure between said object angular locations and said gaze angles;
deciding on acceptance of said each moving object for use in calibration based on a comparison of said first distance measure to a distance measure threshold; and
estimating an eye tracking calibration angle based on a minimization of a second distance measure, said second distance measure computed between said angular locations of said accepted moving objects and said gaze angles.

19. The non-transitory computer-readable storage medium of claim 18, further comprising the operation of detecting said moving objects based on template matching, optical flow tracking, background segmentation, Scale Invariant Feature Transform (SIFT) matching, particle filtering and/or Positive-Negative tracking.

20. The non-transitory computer-readable storage medium of claim 18, further comprising the operation of rejecting said moving objects based on a visual size of said moving object exceeding a size threshold.

21. The non-transitory computer-readable storage medium of claim 18, further comprising the operation of rejecting said moving objects based on a visual speed of said moving object exceeding a speed threshold.

22. The non-transitory computer-readable storage medium of claim 18, further comprising the operation of rejecting said moving objects based on a determination that the extremities of said gaze angle associated with said moving object fail to exceed a range of motion threshold.

23. The non-transitory computer-readable storage medium of claim 18, further comprising the operations of tracking motion of said scene facing camera and rejecting said moving objects based on a correlation of said object motion with said scene facing camera motion.

24. The non-transitory computer-readable storage medium of claim 18, wherein said minimization is based on a Newton-Gauss algorithm or a Levenberg-Marquardt algorithm.

25. The non-transitory computer-readable storage medium of claim 18, further comprising the operation of estimating the distance between said moving object and said scene facing camera for conversion of locations of said moving objects from a world coordinate system to an eye coordinate system.

26. The non-transitory computer-readable storage medium of claim 18, further comprising the operation of resampling said estimated object angular locations and said estimated gaze angles to a common time coordinate system.

* * * * *